(12) United States Patent
Hamamoto et al.

(10) Patent No.: US 11,796,034 B2
(45) Date of Patent: Oct. 24, 2023

(54) FRICTION TRANSMISSION BELT AND PRODUCTION METHOD THEREFOR

(71) Applicant: Mitsuboshi Belting Ltd., Kobe (JP)

(72) Inventors: Kouhei Hamamoto, Hyogo (JP); Hiroki Takechi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 415 days.

(21) Appl. No.: 17/284,732

(22) PCT Filed: Sep. 30, 2019

(86) PCT No.: PCT/JP2019/038650
§ 371 (c)(1),
(2) Date: Apr. 12, 2021

(87) PCT Pub. No.: WO2020/075566
PCT Pub. Date: Apr. 16, 2020

(65) Prior Publication Data
US 2021/0324938 A1    Oct. 21, 2021

(30) Foreign Application Priority Data

Oct. 12, 2018  (JP) .................................. 2018-193570
Sep. 10, 2019  (JP) .................................. 2019-164423

(51) Int. Cl.
*F16G 5/06*    (2006.01)
*B29D 29/10*   (2006.01)
(Continued)

(52) U.S. Cl.
CPC ............... *F16G 5/06* (2013.01); *B29D 29/10* (2013.01); *C08G 18/542* (2013.01); *D01F 8/02* (2013.01);
(Continued)

(58) Field of Classification Search
CPC ..... F16G 5/20; F16G 5/08; F16G 5/06; F16G 1/10; F16G 1/04; D06M 15/564;
(Continued)

(56) References Cited

U.S. PATENT DOCUMENTS 3,090,716 A * 5/1963 Stevens ..................... F16G 5/06
                                                   8/115.67
3,894,900 A * 7/1975 Redmond, Jr. ........... F16G 1/28
                                                   428/179
(Continued)

FOREIGN PATENT DOCUMENTS

CN           1495373 A      5/2004
CN         101454592 A      6/2009
(Continued)

OTHER PUBLICATIONS

Jun. 3, 2022—(EP) Extended Search Report—App 19871126.9.
(Continued)

*Primary Examiner* — Henry Y Liu
(74) *Attorney, Agent, or Firm* — Banner & Witcoff, Ltd.

(57) ABSTRACT

The frictional power transmission belt includes a frictional power transmission surface formed of a composite fibrous layer containing a fibrous member, an isocyanate compound, and a resin component, wherein the fibrous member contains a cellulose-based fiber. A proportion of each of the isocyanate compound and the resin component in the composite fibrous layer may be 2 to 15% by mass.

14 Claims, 3 Drawing Sheets

(51) Int. Cl.
  *C08G 18/54* (2006.01)
  *D01F 8/02* (2006.01)
  *D01F 8/04* (2006.01)
  *D06M 15/564* (2006.01)
  *F16G 5/20* (2006.01)
  *D06M 101/06* (2006.01)
  *D06M 101/16* (2006.01)

(52) U.S. Cl.
  CPC ............ *D01F 8/04* (2013.01); *D06M 15/564* (2013.01); *F16G 5/20* (2013.01); *D06M 2101/06* (2013.01); *D06M 2101/16* (2013.01)

(58) Field of Classification Search
  CPC .......... D06M 2201/06; D06M 2101/06; C08G 18/542; D01F 8/02; D01F 8/04
  USPC .................................................. 474/238, 266
  See application file for complete search history.

(56) References Cited

U.S. PATENT DOCUMENTS

| | | | | |
|---|---|---|---|---|
| 3,964,328 | A * | 6/1976 | Redmond, Jr. | B29D 29/08 474/205 |
| 4,330,287 | A * | 5/1982 | Fischer | F16G 1/28 474/252 |
| 4,798,566 | A * | 1/1989 | Sedlacek | F16G 5/06 474/263 |
| 4,891,040 | A * | 1/1990 | Nagai | D02G 3/447 474/267 |
| 5,536,554 | A * | 7/1996 | Wall | B32B 5/12 428/113 |
| 11,668,371 | B2 * | 6/2023 | Kunihiro | F16H 7/02 474/238 |
| 2001/0036558 | A1 * | 11/2001 | Lewtas | B32B 27/32 428/521 |
| 2004/0005447 | A1 * | 1/2004 | Takehara | F16G 5/20 428/292.1 |
| 2005/0096433 | A1 * | 5/2005 | Takehara | F16G 5/06 525/211 |
| 2007/0249451 | A1 * | 10/2007 | Wu | F16G 1/28 474/263 |
| 2008/0286529 | A1 * | 11/2008 | Sueto | F16G 5/08 428/167 |
| 2009/0011884 | A1 * | 1/2009 | Nakashima | F16G 5/20 474/205 |
| 2009/0075770 | A1 * | 3/2009 | Yoshida | F16G 1/28 474/260 |
| 2009/0142572 | A1 * | 6/2009 | Burlett | F16G 1/08 156/137 |
| 2009/0227406 | A1 * | 9/2009 | Wu | C08G 18/4277 474/260 |
| 2012/0258829 | A1 * | 10/2012 | Little | C08K 5/0025 474/237 |
| 2013/0040771 | A1 * | 2/2013 | Well | F16G 1/28 474/205 |
| 2013/0085028 | A1 * | 4/2013 | Yamada | F16G 5/08 474/263 |
| 2013/0150488 | A1 * | 6/2013 | Feng | C08L 21/00 524/9 |
| 2014/0135161 | A1 * | 5/2014 | Mori | D03D 1/0094 474/238 |
| 2014/0238581 | A1 * | 8/2014 | Brocke | F16G 1/10 156/137 |
| 2014/0296011 | A1 * | 10/2014 | Yoshida | F16G 5/08 264/172.19 |
| 2015/0087456 | A1 * | 3/2015 | Baltes | F16G 5/08 474/266 |
| 2015/0148165 | A1 * | 5/2015 | Matsuda | F16G 1/21 474/264 |
| 2015/0285335 | A1 * | 10/2015 | Mitsutomi | F16G 5/06 156/137 |
| 2016/0053851 | A1 * | 2/2016 | Kojima | F16G 5/08 474/265 |
| 2017/0009847 | A1 * | 1/2017 | Mitsutomi | D04B 21/20 |
| 2017/0167076 | A1 * | 6/2017 | Fujii | D06M 15/55 |
| 2017/0284504 | A1 * | 10/2017 | Mitsutomi | F16G 5/08 |
| 2018/0194561 | A1 * | 7/2018 | Remp | B32B 5/26 |
| 2018/0223953 | A1 * | 8/2018 | Harada | B32B 3/30 |
| 2018/0313028 | A1 * | 11/2018 | Tomoda | F16G 1/28 |
| 2019/0219134 | A1 * | 7/2019 | Kunihiro | C08L 23/08 |

FOREIGN PATENT DOCUMENTS

| | | |
|---|---|---|
| CN | 105874118 A | 8/2016 |
| CN | 105992891 A | 10/2016 |
| CN | 106715960 A | 5/2017 |
| DE | 10230306 A1 | 1/2004 |
| EP | 3739237 A1 | 11/2020 |
| EP | 3892452 A1 | 10/2021 |
| EP | 3919263 A1 | 12/2021 |
| JP | H05-044784 A | 2/1993 |
| JP | H06-022393 A | 1/1994 |
| JP | H06-022393 U | 3/1994 |
| JP | 2006007534 A | 1/2006 |
| JP | 2011-099457 A | 5/2011 |
| JP | 2014-209028 A | 11/2014 |
| JP | 2015-127590 A | 7/2015 |
| JP | 2015-143573 A | 8/2015 |

OTHER PUBLICATIONS

Nov. 26, 2015—International Search Report—Intl App PCT/JP2019/038650.

Mar. 7, 2022—(CN) The First Office Action—App 201980066781.5.

"Technical Handbook for Printing and Dyeing Workers", Shanghai Printing and Dyeing Industry Corporation Light Industry Press, May 31, 1975, pp. 110-112.

Jun. 27, 2022—(CN) Decision of Rejection—App 201980066781.5.

* cited by examiner

FRICTION TRANSMISSION BELT AND PRODUCTION METHOD THEREFOR

CROSS REFERENCE TO RELATED APPLICATIONS

This is a U.S. National Phase Application under 35 U.S.C. § 371 of International Application No. PCT/JP2019/038650, filed Sep. 30, 2019, which claims priority to Japanese Application Nos. 2018-193570, filed Oct. 12, 2018, and 2019-164423, filed Sep. 10, 2019, which was published Under PCT Article 21(2), the entire contents of which are incorporated herein by reference.

TECHNICAL FIELD

The present invention relates to a frictional power transmission belt (V-ribbed belt or the like) that has a frictional power transmission surface covered with fabric (knitted fabric or the like) and has high transmission efficiency and improved quietness (silence or noise suppression), and relates to a production method therefor.

BACKGROUND ART

Frictional power transmission belts are widely used for driving auxiliary equipment of automobiles and for driving agricultural machines. Examples of the frictional power transmission belts include a flat belt, a V-belt, and a V-ribbed belt, and the frictional power transmission belts are used separately from an engagement transmission belt represented by a toothed belt that transmits power through mechanical fitting between a pulley and a belt tooth portion. Some frictional power transmission belts have a frictional power transmission surface covered with a fibrous member in order to improve wear resistance or adjust a friction coefficient. Woven fabric, knitted fabric, unwoven fabric, or the like can be applied for the fibrous member, and as fibers constituting these fibrous members, various fibers can be used in accordance with the requirements such as wear resistance and water absorbency.

For example, JP-A-2014-209028 (Patent Literature 1) discloses a V-ribbed belt having a frictional power transmission surface covered with knitted fabric that is knitted with polyester-based composite yarns which is a bulky-textured yarn and cellulose-based natural spun yarns, in which a knitting ratio of the cellulose-based natural spun yarns is equal to or higher than a knitting ratio of the polyester-based composite yarns. This literature discloses that knitting ratios of the polyester-based composite yarns and the cellulose-based natural spun yarns are adjusted, and thereby, both an increase in a friction coefficient of the frictional power transmission surface in a dry state and a decrease in the friction coefficient of the frictional power transmission surface in a wet state can be prevented, and a difference between the friction coefficient in the dry state and the friction coefficient in the wet state can be sufficiently reduced.

The V-ribbed belt exhibits a certain effect of preventing occurrence of abnormal noise due to so-called "stick-slip" in which large slip occurs intermittently between the belt and the pulley. However, in this V-ribbed belt, the cellulose-based natural spun yarns may fall off from the frictional power transmission surface as the belt is used and the abnormal noise may be likely to occur since the cellulose-based natural spun yarns having low wear resistance are essential, and therefore, this V-ribbed belt is required to be improved.

Further, Patent Literature 1 discloses an adhesion treatment such as an immersion treatment in a rubber paste in order to improve adhesion between a knitted fabric and a compression layer in this V-ribbed belt. As such an adhesion treatment, a method is adopted in industrial production, in which a fibrous member such as the above-described knitted fabric is dipped in an immersion solution containing an adhesive component, and then, is dried by a hot air drying furnace with a pin tenter. However, the fibrous member impregnated with the adhesive component is likely to have a decreased releasability from a pin of the pin tenter. When the releasability from the pin is decreased, problems such as deformation and tearing of the fibrous member or bending and breaking of the pin of the tenter occur.

As a method for enhancing releasability of a fabric from a pin tenter, JP-UM-H6-22393 (Patent Literature 2) discloses a pin tenter in which a fluororesin layer is provided on a surface of a pin planted in a pin sheet. However, this method requires equipment changes and is not economical.

CITATION LIST

Patent Literature

Patent Literature 1: JP-A-2014-209028 (claim 1, paragraph [0011], Examples)
Patent Literature 2: JP-UM-H6-22393 (claim 1)

SUMMARY OF INVENTION

Technical Problem

Accordingly, an object of the present invention is to provide a frictional power transmission belt that has high durability when submerged, can maintain transmission performance over a long period of time, and also has high productivity, and a method for producing the frictional power transmission belt.

Another object of the present invention is to provide a frictional power transmission belt that has high noise suppression and can maintain, over a long period of time, the noise suppression when submerged, and a method for producing the frictional power transmission belt.

Still another object of the present invention is to provide a frictional power transmission belt that can be easily produced with a small environmental load, and a method for producing the frictional power transmission belt.

Still more another object of the present invention is to provide a frictional power transmission belt excellent in wear resistance, and a method for producing the frictional power transmission belt.

Solution to Problem

As a result of intensive studies to achieve the above object, the present inventors have found that a frictional power transmission surface (power transmission surface) to be in contact with a pulley is formed by a composite fibrous layer containing a fibrous member containing a cellulose-based fiber, an isocyanate compound, and a resin component, whereby the durability when submerged can be improved, the transmission performance can be maintained over a long period of time, and the productivity can also be improved, and have completed the present invention.

That is, a frictional power transmission belt of the present invention is a frictional power transmission belt having a frictional power transmission surface formed of a composite fibrous layer containing a fibrous member, an isocyanate compound, and a resin component, and the fibrous member contains a cellulose-based fiber. A proportion of each of the isocyanate compound and the resin component in the composite fibrous layer may be about 2 to 15% by mass. A mass ratio of the isocyanate compound to the resin component may be about 95:5 to 20:80. The isocyanate compound may be a thermally reactive isocyanate compound (blocked isocyanate compound). A dissociation temperature of the thermally reactive isocyanate compound may be 120° C. or higher. The resin component may be a hydrophilic resin. The cellulose-based fiber may be a spun yarn formed of cellulose. The fibrous member may further contain a synthetic fiber. The frictional power transmission belt may be a V-ribbed belt.

The present invention also includes a method for producing the frictional power transmission belt. The method includes a composite fibrous layer forming step of immersing a fibrous member into a liquid composition containing an isocyanate compound and a resin component, and then heat-setting the fibrous member impregnated with the liquid composition by using a pin tenter, to form a composite fibrous layer sheet. The liquid composition may be an aqueous solution containing a thermally reactive isocyanate compound and a hydrophilic resin. In the composite fibrous layer forming step, the fibrous member impregnated with the liquid composition by the immersion may be dried at a temperature lower than a dissociation temperature of the thermally reactive isocyanate compound. The proportion of each of the isocyanate compound and the resin component in the liquid composition may be about 1 to 8% by mass. A mass ratio of the isocyanate compound to the resin component in the liquid composition may be 95:5 to 20:80.

Advantageous Effects of Invention

In the present invention, the frictional power transmission surface of the frictional power transmission belt is formed of the composite fibrous layer containing the fibrous member containing the cellulose-based fiber, the isocyanate compound, and the resin component, so that the durability when submerged is excellent, and the deterioration of the transmission performance is small, and in addition, in the production process of the composite fibrous layer, the releasability of the obtained precursor (composite fibrous layer sheet) from the pin can be improved even when a tenter treatment is performed, and thus the productivity (workability) is also high. In particular, by combining the isocyanate compound and the resin component at a specific ratio, the noise suppression when submerged can be improved, and the noise suppression when submerged can be maintained over a long period of time. In addition, when the thermally reactive isocyanate compound is used as the isocyanate compound, the elongation of the knitted fabric is not inhibited at the time of forming the belt, and the thermally reactive isocyanate compound is cured after vulcanization of the belt to improve the wear resistance, so that the productivity of the frictional power transmission belt having excellent durability can be improved. When the immersion solution containing the isocyanate compound and the resin component is prepared in an aqueous system, the liquid preparation is simple and the environmental load is small, as compared with a resorcin-formalin-latex solution (RFL solution) which is widely used as a canvas treatment agent. In addition, the belt is also excellent in wear resistance, and the wear resistance can be further improved by adjusting the fibers constituting the fibrous member.

DESCRIPTION OF EMBODIMENTS

Hereinafter, the present invention is described in detail with reference to the accompanying drawings as necessary. A frictional power transmission belt of the present invention is not particularly limited as long as it has a frictional power transmission surface that can come into contact with a pulley, and may be a V-belt, a V-ribbed belt, a flat belt, or the like. The frictional power transmission belt may be a belt in which a friction transmission part (ribs, etc.) is formed, and a typical transmission belt is a V-ribbed belt having high transmission efficiency in which a plurality of V-shaped ribs extending in a belt circumference direction are formed. The present invention is also particularly suitably used for a V-ribbed belt, which is particularly strongly required to improve the durability (in particular, noise suppression) when submerged, among frictional power transmission belts, from a viewpoint that the effect of improving the durability (in particular, noise suppression) when submerged is the largest.

Figure 1:
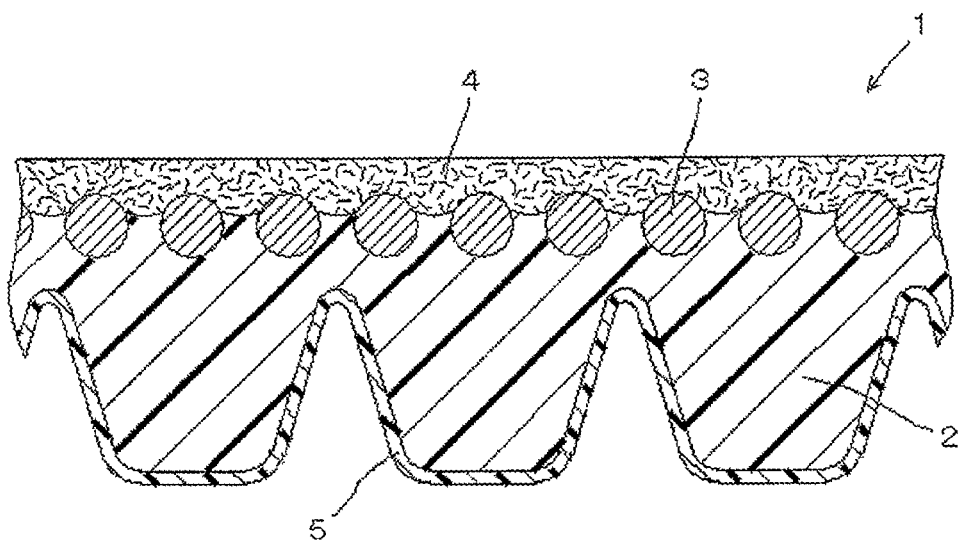
FIG. 1 is a schematic sectional view showing an example of a frictional power transmission belt of the present invention.

As shown in FIG. 1, a frictional power transmission belt (V-ribbed belt) 1 of the present invention includes a tension layer 4 that forms a belt back surface (outer peripheral surface of the belt) and is formed of a cover canvas (woven fabric, knitted fabric, unwoven fabric, etc.), a compression layer (compression rubber layer) 2 that is provided on an inner peripheral side of the tension layer 4, a composite fibrous layer 5 that is applied (laminated) on a surface (inner peripheral surface) of the compression layer (compression rubber layer) 2 to form a belt inner peripheral surface and can be brought into contact with a pulley, and a tension member 3 that is embedded between the tension layer 4 and the compression layer 2 along a belt longitudinal direction (circumference direction). In this example, the tension member 3 is a core wire (twisted cord) arranged at a predetermined interval in a belt width direction, and is interposed between the tension layer 4 and the compression layer 2 while being in contact with the tension layer 4 and the compression layer 2.

A plurality of grooves having a V-shape in section, which extend in the belt longitudinal direction, are formed in the compression layer 2, and a plurality of ribs each having a V-shape in section (i.e., inverted trapezoid shape) are formed between the grooves. Surfaces of the ribs are covered with the composite fibrous layer 5. Two inclined surfaces of a rib can be brought into contact with a pulley via the composite fibrous layer 5, and the composite fibrous layer 5 contains a fibrous member containing cellulose-based fibers, an isocyanate compound, and a resin component.

The present invention is suitably applied to a transmission belt in which a frictional power transmission surface (or a friction transmission part) with a pulley is formed on the compression layer 2. The frictional power transmission belt of the present invention is not limited to the above-described structure. For example, the tension layer 4 may be formed of a rubber composition, and an adhesive layer may be interposed between the compression layer 2 and the tension layer 4 in order to improve adhesion between the tension member 3 and the tension layer 4 or adhesion between the tension member 3 and the compression layer 2. The tension member 3 is embedded between the tension layer 4 and the compression layer 2. For example, the tension member 3 may be embedded in the compression layer 2, or may be embedded in the compression layer 2 while being in contact with the tension layer 4. Further, the tension member 3 may be embedded in the adhesive layer, or the tension member 3 may be embedded between the compression layer 2 and the adhesive layer or between the adhesive layer and the tension layer 4.

Hereinafter, each member constituting the belt and a method for producing the belt is described in detail.

[Composite Fibrous Layer]

The composite fibrous layer contains a fibrous member, an isocyanate compound, and a resin component.

(Fibrous Member)

In the present invention, the fibers constituting the fibrous member contain cellulose-based fibers, so that the frictional power transmission surface is excellent in water absorbency, a water film is less likely to be formed between the pulley and the belt, occurrence of stick-slip is prevented, and durability and noise suppression when submerged are high.

(A) Cellulose-Based Fiber

Examples of the cellulose-based fibers include cellulose fibers (cellulose fibers derived from plants, animals, bacteria, etc.) and fibers of cellulose derivatives.

Examples of the cellulose fibers include: cellulose fibers (pulp fibers) derived from natural plants, such as wood pulp (coniferous tree pulp, hardwood pulp, etc.), bamboo fibers, sugar cane fibers, seed hair fibers (cotton fibers (cotton linter), kapok, etc.), bast fibers (hemp, mulberry, Edgeworthia Chrysantha, etc.), leaf fibers (Manila hemp, New Zealand hemp); cellulose fibers derived from animals, such as ascidian cellulose; bacterial cellulose fibers; and algae cellulose.

Examples of the fibers of cellulose derivatives include: cellulose ester fibers; and regenerated cellulose fibers (rayon, cupro, lyocell, etc.).

Each of these cellulose-based fibers may be used alone, or two or more kinds thereof may be used in combination. Among these, the cellulose fibers such as cotton fibers and hemp, and regenerated cellulose fibers such as rayon are preferred, and cellulose fibers such as cotton fibers are particularly preferred, from the viewpoint of water absorbency.

The cellulose-based fibers may be a short fiber, but a long fiber or a spun yarn obtained by twisting a short fiber is preferred from the viewpoint of strength. The long fiber may be a monofilament yarn or a multifilament yarn. The multifilament yarn may be a non-twisted yarn or a twisted yarn. The twisted yarn may be a yarn (for example, a plied yarn, a Koma twist yarn, or a Lang lay yarn) that is obtained by finally twisting a plurality of single twisted yarns as primary twisted yarns, or may be a yarn (for example, a corkscrew yarn) that is obtained by aligning a single twisted yarn and a raw yarn (a non-twisted yarn), and twisting them together. Among these, in the case of the cellulose fibers, a spun yarn and a multifilament yarn are preferred, and a spun yarn is particularly preferred.

In the case of the spun yarn, the thickness (yarn count) of the cellulose-based fiber (particularly, the cellulose fiber) is, for example, about 5 to 100, preferably about 10 to 80, and more preferably about 20 to 70 (particularly, about 30 to 50). When the thickness is too small, the mechanical properties of the composite fibrous layer may decrease, and when the thickness is too large, the water absorbency may decrease.

(B) Synthetic Fiber

The fibrous member may further contain a synthetic fiber in addition to the cellulose-based fiber in order to prevent the wear of the cellulose-based fiber and maintain, over a long period of time, durability (particularly, noise suppression) when submerged.

Examples of the synthetic fiber include polyolefin fibers (polyethylene fibers, polypropylene fibers, etc.), vinyl alcohol-based fibers (fibers of a copolymer of polyvinyl alcohol and ethylene-vinyl alcohol, vinylon, etc.), polyamide fibers (aliphatic polyamide fibers such as polyamide 6 fibers, polyamide 66 fibers, and polyamide 46 fibers, aromatic polyamide fibers such as aramid fibers, etc.), acrylic fibers, polyester fibers[$C_{2-4}$ alkylene $C_{6-14}$ arylate-based fibers such as polyethylene terephthalate (PET) fibers, polypropylene terephthalate (PPT) fibers, polytrimethylene terephthalate (PTT) fibers, polybutylene terephthalate (PBT) fibers, and polyethylene naphthalate (PEN) fibers, polyarylate-based fibers, etc.], polyparaphenylene benzobisoxazole (PBO) fibers, and polyurethane fibers. Each of these synthetic fibers may be used alone or two or more kinds thereof may be used in combination.

The synthetic fiber may also be a short fiber similarly to the cellulose-based fiber, but a monofilament yarn or a multifilament yarn which is a long fiber is preferred, and the multifilament yarn is particularly preferred, from the viewpoint of strength. The multifilament yarn may be a non-twisted yarn or a twisted yarn. The twisted yarn may be a yarn (for example, a plied yarn, a Koma twist yarn, or a Lang lay yarn) that is obtained by finally twisting a plurality of single twisted yarns as primary twisted yarns, or may be a yarn (for example, a corkscrew yarn) that is obtained by aligning a single twisted yarn and a raw yarn (a non-twisted yarn), and twisting them together.

The multifilament yarn (or the twisted yarn) may be a composite yarn (or a composite fiber) formed of a plurality of fibers (or yarns). The composite yarn (twisted yarn) may be a covering yarn [yarn (twisted yarn) including a core yarn and a sheath yarn wound around (covering) the core yarn]. The composite yarn may be a composite yarn of the cellulose-based fiber and the synthetic fiber, but a composite fiber of synthetic fibers (a composite yarn of synthetic fibers) is generally used.

The composite yarn of the synthetic fibers may be, for example, a composite yarn obtained by conjugating a plurality of polyester fibers (for example, PET fibers and PTT fibers), and a covering yarn in which both a core yarn and a sheath yarn are formed of synthetic fibers [for example, a yarn in which either of a core yarn and a sheath yarn is formed of an elastic fiber, for example, a covering yarn or a composite yarn in which a core yarn is formed of an elastic fiber such as a polyurethane fiber (PU fiber), and a sheath yarn is formed of a polyester fiber (PET fiber, etc.)].

In the present invention, in order to improve the wear resistance of the composite fibrous layer and prevent rubber from oozing out to a frictional power transmission surface (or a surface of the fibrous member), preferred is a bulky-textured yarn in which bulkiness of a cross section is increased, such as a conjugated yarn (a composite yarn of crimp fibers) that includes a plurality of fibers and is crimped, a covering yarn in which a core yarn is covered with the above-described synthetic fiber, a crimped yarn (crimped yarn of the above-described synthetic fibers), a wooly treated yarn, a Taslan-finished yarn, and an interlaced yarn, and the conjugated yarn and the covering yarn are particularly preferred. The above-described conjugated yarn is a bulky-textured yarn which has a cross-sectional structure in which a plurality of polymers are phase-separated and bonded to each other in a fiber axis direction, and in which crimping is caused due to a heat treatment by using a difference of heat shrinkages of the above-described polymers. The covering yarn is a bulky-textured yarn in which the bulkiness of cross sections of the entire yarn is increased by winding another yarn around a surface of a core yarn and covering the core yarn. Examples of the typical bulky-textured yarns include: conjugated yarns such as a polyester-based composite yarn, for example, a composite yarn obtained by conjugating PTT and PET (a PTT/PET conjugated yarn), and a composite yarn obtained by conjugating PBT and PET (a PBT/PET conjugated yarn); and a covering yarn such as a composite yarn in which a polyester fiber (for example, a PET fiber) is wound around a surface of a polyurethane (PU) yarn (a PU elastic yarn) as a core yarn, and covers the surface thereof (for example, a PET/PU covering yarn), and a composite yarn in which a PU yarn is used as a core yarn and polyamide (PA) covers the PU yarn (a PA/PU covering yarn). Among these composite yarns, PTT/PET conjugated yarns, PET/PU covering yarns, and the like are preferred from the viewpoint of excellent elasticity and wear resistance.

Such a bulky-textured yarn makes the fibrous member bulky, and causes the fiber to have elasticity. Therefore, when the bulky-textured yarn is used, it is possible to prevent rubber of a belt body from oozing out to the frictional power transmission surface (or the surface of the fibrous member) due to the bulkiness, and to prevent an increase in the friction coefficient of the frictional power transmission surface in a dry state and a decrease in the friction coefficient of the frictional power transmission surface in a wet state. In addition, since the frictional power transmission surface has a high water absorption ability due to the cellulose-based fiber (or the spun yarn), it is possible to prevent a decrease in the friction coefficient of the frictional power transmission surface in a wet state and to sufficiently reduce a difference between the friction coefficient in a dry state and the friction coefficient in a wet state.

The fineness of the synthetic fiber (in particular, the multifilament yarn) may be, for example, about 20 to 600 dtex, preferably about 50 to 300 dtex, and more preferably about 60 to 200 dtex (in particular, about 70 to 100 dtex).

The proportion of the synthetic fiber may be, for example, 200 parts by mass or less (for example, 0 to 200 parts by mass), and is, for example, about 1 to 100 parts by mass, preferably about 3 to 80 parts by mass (for example, about 5 to 50 parts by mass), and more preferably about 10 to 40 parts by mass (in particular, about 20 to 30 parts by mass), based on 100 parts by mass of the cellulose-based fiber. In an application in which wear resistance is important, the proportion of the synthetic fiber is, for example, about 10 to 200 parts by mass, and preferably about 30 to 100 parts by mass based on 100 parts by mass of the cellulose-based fiber. Furthermore, from the viewpoint of excellent balance among durability, noise suppression, wear resistance, and the like, the proportion of the synthetic fiber is more preferably 50 to 80 parts by mass, and most preferably 60 to 70 parts by mass, based on 100 parts by mass of the cellulose-based fiber. When the proportion of the synthetic fiber is too large, the water absorbency of the composite fibrous layer may decrease, and the durability (in particular, noise suppression) when submerged may decrease.

(C) Other Fibers

The fibrous member may further contain other fibers in addition to the cellulose-based fiber and the synthetic fiber. Examples of other fibers include animal-derived fibers such as wool and silk, and inorganic fibers such as carbon fibers, glass fibers, and metal fibers. The proportion of the other fibers may be 100 parts by mass or less (for example, 0 to 100 parts by mass) based on 100 parts by mass of the cellulose-based fiber, and is, for example, about 0.1 to 30 parts by mass, preferably about 0.5 to 20 parts by mass, and more preferably about 1 to 10 parts by mass. When the proportion of the other fibers is too large, the water absorbency of the composite fibrous layer may decrease, and the durability (in particular, noise suppression) when submerged may decrease.

(D) Structure of Fibrous Member

The fibrous member has a form (structure) that can form the frictional power transmission surface of the transmission belt, and can be generally formed of at least one kind of fabric (or canvas) selected from knitted fabric, woven fabric, unwoven fabric, and the like. Among these fabrics, it is preferable to form the fibrous member with the knitted fabric. Since the knitted fabric is excellent in the elasticity, the knitted fabric expands following the flow of rubber during vulcanization. As a result, it is possible to prevent the rubber from being exposed to the frictional power transmission surface, and to improve durability (in particular, noise suppression) when submerged. Further, it is suitable for laminating the fibrous member along an outline (rib shape or the like) of the frictional power transmission surface.

The knitted fabric is formed by forming a loop without linearly crossing yarns. That is, the knitted fabric has a knitted structure in which one or two or more knitting yarns form a stitch (loop) and the next yarn is hooked on the loop to continuously form a new loop. Therefore, it is possible to from a fibrous member that has high elasticity, can be easily laminated along an uneven surface such as a rib portion of the frictional power transmission surface, and can forms and joins the frictional power transmission surface in accordance with the vulcanization molding.

The knitted fabric (or knitting of the knitted fabric) may be either weft knitting (or knitted fabric knitted by the weft knitting) or warp knitting (or knitted fabric knitted by the warp knitting). A preferred knitted fabric is a weft knitted fabric (or a knitted fabric knitted by weft knitting).

The knitted fabric may be a single-layer knitted fabric knitted into a single layer or a multilayer knitted fabric knitted into a plurality of layers. Among the weft knitting (or a knitted structure of weft knitting), examples of single-layer weft knitting include flat knitting (plain knitting), rib knitting, tuck knitting, and purl knitting, and examples of multilayer weft knitting include smooth knitting, interlock knitting, double rib knitting, single pike knitting, Pontidi Roma knitting, miran rib knitting, double jersey knitting, and moss stitch knitting (front moss stitch, back moss stitch, and double moss stitch). Among the warp knitting (or a knitted structure of the warp knitting), examples of single-layer warp knitting include single denbigh and single cord, and examples of multilayer warp knitting include half tricot, double denbigh, double atlas, double cord, and double tricot. The fibrous member may be formed by using one of these knitted fabrics alone or two or more kinds thereof in combination.

Among the knitted fabrics of these knitted structures, the single layer weft knitting (for example, weft knitting in which flat knitting (plain knitting) is used as a knitted structure) or a multilayer knitted fabric (for example, moss stitch knitting (weft knitting in which moss stitch knitting is used as a knitted structure)) is preferred, and the multilayer knitted fabric is particularly preferred. When the fibrous member is formed of a multilayer knitted fabric, a bulky layer of the fibrous member can be formed on the frictional power transmission surface, and the rubber composition forming the compression layer can be prevented from oozing out to a surface side of the fibrous member (the surface side of the frictional power transmission surface). Examples of a method for forming the bulky layer of the fibrous member on the frictional power transmission surface include a method for increasing the number of layers of the knitted fabric and a method for increasing the bulk of the bulky-textured yarn. In the multilayer knitted fabric, the number of layers of the knitted fabric may be, for example, 2 to 5, preferably 2 to 3, and more preferably 2.

In particular, when a knitted fabric (in particular, a multilayer knitted fabric or a multilayer knitted fabric structure) is formed by combining the bulky-textured yarn with the cellulose-based fiber at an appropriate ratio, the rubber can be effectively prevented from oozing out to the frictional power transmission surface (or the surface of the fibrous member). In the multilayer knitted fabric, a layer on the frictional power transmission surface (or a surface of the fibrous member) side in a thickness direction contains more cellulose-based fibers than a layer on a side opposite to the frictional power transmission surface, so that the water absorbency of the frictional power transmission surface can be further improved. The multilayer knitted fabric containing a large number of cellulose-based fibers in the layer on the frictional power transmission surface (or the surface of the fibrous member) side may be produced, for example, by knitting, among the plurality of layers, the layer on the frictional power transmission surface (or the surface of the fibrous member) side with only cellulose-based fibers or with yarns containing cellulose-based fibers and synthetic fibers, and knitting the layer on the opposite side with yarns containing synthetic fibers (polyester-based composite yarns or the like). In the multilayer knitted fabric, contents of the cellulose-based fibers may be increased continuously or stepwise toward the layer on the frictional power transmission surface (or the surface of the fibrous member) side.

In the case of a two-layer knitted fabric formed of a surface layer on the frictional power transmission surface side (a layer in contact with a pulley) and an inner layer on the opposite side, the proportion of cellulose-based fibers in the surface layer may be 50% by mass or more, preferably 70% by mass or more, and may be 100% by mass in an application in which noise suppression is important. In an application in which wear resistance is important, the surface layer may be a combination of cellulose-based fibers and synthetic fibers. When the cellulose-based fibers and the synthetic fibers are combined in the surface layer, a mass ratio of the cellulose-based fibers to the synthetic fibers satisfies former/latter=99/1 to 50/50, preferably 90/10 to 60/40, and more preferably 80/20 to 70/30. The inner layer preferably contains synthetic fibers, and the proportion of the synthetic fibers in the entire fibrous member can be selected from the range described in the item of the above-described fibrous member, and may be 50% by mass or more, preferably 80% by mass or more, and more preferably 100% by mass. A mass ratio of the surface layer to the inner layer satisfies former/latter=95/5 to 50/50, preferably 90/10 to 60/40, and more preferably 85/15 to 70/30 or so.

The density of fibers or yarns in the fibrous member (the knitted fabric or the like) may be, for example, 30 fibers or yarns/inch or more (for example, 32 to 70 fibers or yarns/inch, preferably 34 to 60 fibers or yarns/inch, and more preferably 35 to 55 fibers or yarns/inch) in a wale direction and a course direction. The total density of fibers and yarns may be 60 fibers/inch or more (for example, 62 to 120 fibers and yarns/inch, preferably 70 to 115 fibers and yarns/inch, more preferably 80 to 110 fibers and yarns/inch, and particularly preferably 90 to 105 fibers/inch). A fibrous member (knitted fabric or the like) having a predetermined fiber or yarn density does not have too large openings (or stitches), and is excellent in balance between wear resistance and water absorbency. When the total density of the fibrous member is too small, not only the wear resistance decreases, but also the water absorbency may decrease.

The bulkiness of the fibrous member (for example, a knitted fabric in which a composite yarn such as a bulky-textured yarn is knitted as a synthetic fiber) can be selected within a range in which rubber can be prevented from oozing out, and may be, for example, about 2 $cm^3/g$ or more (for example, 2.2 to 4.5 $cm^3/g$), and preferably about 2.4 $cm^3/g$ or more (for example, 2.5 to 4 $cm^3/g$). The upper limit of the bulkiness is not particularly limited, and may be, for example, 4 $cm^3/g$ or less (for example, 2.3 to 3.8 $cm^3/g$) or 3.5 $cm^3/g$ or less (for example, 2.5 to 3.3 $cm^3/g$). The bulkiness ($cm^3/g$) can be calculated by dividing the thickness (cm) of the knitted fabric by the mass per unit area ($g/cm^2$).

The fibrous member may have a basis weight of, for example, about 50 to 500 $g/m^2$, preferably about 80 to 400 $g/m^2$, and more preferably about 100 to 350 $g/m^2$.

(Isocyanate Compound)

The composite fibrous layer contains an isocyanate compound in addition to the fibrous member, so that the wear resistance of the composite fibrous layer is enhanced, and the durability (particularly, noise suppression) when submerged can be maintained over a long period of time. Specifically, since the isocyanate compound has a highly reactive isocyanate group, the isocyanate group reacts with a functional group (a group having an active hydrogen atom such as a hydroxyl group or a carboxyl group) in cellulose-based fibers constituting the fibrous member and a rubber component of the compression layer described later, to improve the mechanical properties of the fibrous member itself and the adhesion with the compression layer, thereby improving the wear resistance of the composite fibrous layer. In the present invention, since the fibrous member constituting the composite fibrous layer is combined with the isocyanate compound, the adhesion and mechanical properties of the composite fibrous layer can be improved without using a resorcin-formalin-latex solution (RFL solution) or an epoxy resin which is widely used as a canvas treatment agent.

The isocyanate compound has an isocyanate group as described above, and a polyisocyanate having a plurality of isocyanate groups (in particular, diisocyanate) is preferred from the viewpoint of improving the wear resistance of the composite fibrous layer.

Further, the isocyanate compound may be a general-purpose isocyanate compound (which is an isocyanate compound that is not protected by a blocking agent, and is a polyisocyanate exemplified as a polyisocyanate constituting a thermally reactive isocyanate compound described later), and a thermally reactive isocyanate compound (blocked isocyanate compound) is preferred from the viewpoints that the elasticity of the fibrous member is not inhibited during the formation of a belt, the isocyanate compound is cured after the vulcanization of the belt to enhance the wear resistance, and the productivity of the belt can be improved. Specifically, when the isocyanate compound is a thermally reactive isocyanate compound, the isocyanate group is inactive by being protected by the blocking agent during formation of the belt, and is not cured. Therefore, the blocking agent is dissociated due to heat generated when vulcanizing the rubber, the isocyanate group is activated and reacts with the above-described functional group to be cured while the elongation of the fibrous member is not inhibited. Therefore, when the thermally reactive isocyanate compound is used, the wear resistance of the belt can be enhanced without decreasing the productivity of the belt.

As the thermally reactive isocyanate compound, a commonly used thermally reactive polyisocyanate (blocked isocyanate) can be used. Specifically, examples of the polyisocyanates constituting the thermally reactive polyisocyanates include aliphatic polyisocyanates [aliphatic diisocyanates such as propylene diisocyanate, trimethylene diisocyanate, tetramethylene diisocyanate, hexamethylene diisocyanate (HDI), trimethylhexamethylene diisocyanate (TMDI), and lysine diisocyanate (LDI), or aliphatic triisocyanates such as 1,6,11-undecane triisocyanate methyl octane, and 1,3,6-hexamethylene triisocyanate], alicyclic polyisocyanates [alicyclic diisocyanates such as cyclohexane 1,4-diisocyanate, isophorone diisocyanate (IPDI), hydrogenated xylylene diisocyanate, and hydrogenated bis(isocyanatophenyl)methane, or alicyclic triisocyanates such as bicycloheptane triisocyanate], and aromatic polyisocyanates [aromatic diisocyanates such as phenylene diisocyanate, toluene diisocyanate (TDI), xylylene diisocyanate (XDI), tetramethylxylene diisocyanate (TMXDI), naphthalene diisocyanate (NDI), bis(isocyanatophenyl)methane (MDI), toluidine diisocyanate (TODI), and 1,3-bis(isocyanatophenyl)propane].

These polyisocyanates may be derivatives such as multimers (dimers, trimers, tetramers, etc.), adducts, modified products (biuret modified products, alohanate modified products, urea modified products, etc.), or urethane oligomers having a plurality of isocyanate groups.

As the modified product or the derivative of the polyisocyanate, for example, an adduct of a polyisocyanate (an aliphatic polyisocyanate such as hexamethylene diisocyanate) and a polyhydric alcohol (trimethylolpropane, pentaerythritol, etc.), a biuret product of the above-described polyisocyanate, a multimer of the above-described polyisocyanate, or the like can be preferably used. From the viewpoint of the adhesion and the wear resistance of the composite fibrous layer, a multimer of a polyisocyanate (for example, an aliphatic polyisocyanate), for example, a polyisocyanate having an isocyanurate ring such as a trimer of hexamethylene diisocyanate, is particularly preferred.

Among these polyisocyanates, aliphatic polyisocyanates and derivatives thereof (for example, HDI and a trimer thereof), aromatic polyisocyanates (TDI, MDI, etc.), or the like are widely used.

Examples of the blocking agent (protective agent) of the thermally reactive isocyanate compound include $C_{1-24}$ monoalcohols such as methanol, ethanol, and isopropanol, or alkylene oxide adducts thereof (for example, $C_{2-4}$ alkylene oxide adducts such as ethylene oxide); phenols such as phenol, cresol, and resorcin; oximes such as acetoxime, methylethylketoxime, and cyclohexaneoxime; lactams such as ε-caprolactam and valerolactam; and secondary amines such as dibutylamine and ethyleneimine Each of these blocking agents may be used alone, or two or more kinds thereof may be used in combination. Among these, the oximes, the lactams, or the like are widely used.

A content of the isocyanate group in the thermally reactive isocyanate compound is not particularly limited, and may be, for example, about 1 to 50% by mass, preferably about 3 to 40% by mass, and more preferably about 5 to 30% by mass.

The dissociation temperature of the thermally reactive isocyanate compound (the temperature at which the blocking agent dissociates and the active isocyanate group is regenerated) is equal to or higher than the heating temperature in the belt forming step before the vulcanization step of a rubber component (generally equal to or higher than the drying temperature of the fibrous member impregnated with a liquid composition by immersion in the composite fibrous layer forming step described later), and may be equal to or lower than the vulcanization temperature of the rubber component. When the dissociation temperature is high, the drying temperature can be raised, and therefore, the productivity can be improved. The specific dissociation temperature may be, for example, 120° C. or higher (preferably 150° C. or higher, and more preferably 180° C. or higher), and is, for example, about 120 to 250° C. (for example, 150 to 240° C.), preferably about 160 to 230° C. (for example, 170 to 220° C.), and more preferably about 175 to 210° C. (in particular, 180 to 200° C.). When the dissociation temperature is too low, the drying temperature cannot be raised, and thus it takes time to dry, which may reduce the productivity.

The proportion of the isocyanate compound may be about 1 to 20% by mass in the composite fibrous layer, and is, for example, about 2 to 15% by mass, preferably about 3 to 13% by mass, and more preferably about 4 to 12% by mass (in particular, about 4.5 to 10% by mass) from the viewpoint that both the flexibility and the wear resistance of the belt can be achieved, and the wear resistance is increased and the durability (in particular, noise suppression) when submerged can be maintained over a long period of time while maintaining the flexibility of the fibrous member or the belt. When the proportion of the isocyanate compound is too small, the effect of improving the wear resistance may be reduced, and the durability (in particular, noise suppression) when submerged may be reduced, whereas when the proportion of the isocyanate compound is too large, the flexibility of the fibrous member or the belt may decrease.

The isocyanate compound may be present in any form as long as it covers at least a part of the fibers constituting the fibrous member. As a distribution area of the isocyanate compound present in the fibrous member, the isocyanate compound may be present either on the surface of the fibrous member or between the fibers inside the fibrous member. From the viewpoint of improving the wear resistance of the composite fibrous layer, the isocyanate compound is distributed and present substantially uniformly (in particular, uniformly) over the entire fibrous member including a space (porous structure) between the fibers inside the fibrous member. In the present invention, as described later, the isocyanate compound can be easily and uniformly distributed in the fibrous member according to a method for immersing the fibrous member in a liquid composition containing the isocyanate compound and the resin component.

(Resin Component)

The composite fibrous layer contains a resin component in addition to the fibrous member and the isocyanate compound, so that the releasability of a composite fibrous layer sheet from a pin can be improved, even when a tenter treatment is performed, in the steps for producing the composite fibrous layer.

The resin component may be either a thermoplastic resin or a thermosetting resin, and various thermoplastic resins and thermosetting resins can be used. The resin component may be a non-adhesive resin or a non-sticky resin from the viewpoint that adhesion or stickiness to a pin due to the isocyanate compound can be reduced and the releasability of the fibrous member from the pin can be improved. Therefore, the viscosity (measured by a B-type viscosity meter) of the resin component is, for example, about 1 to 100 mPa s, preferably about 3 to 50 mPa s, and more preferably about 5 to 20 mPa s (in particular, about 8 to 15 mPa s) in a 20% by mass aqueous solution (25° C.). When the viscosity is too high, the permeability is reduced, and thus the resin component may hardly impregnate an inside of the fibrous member uniformly. When the viscosity is too low, an adhesion amount of the resin component to the fibrous member decreases, and thus a sufficient amount of the resin component may hardly adhere to the fibrous member. The liquid composition (in particular, aqueous solution) of the resin component is preferably anionic or neutral from the viewpoint of improving the dispersibility of the liquid composition containing the isocyanate compound and the resin component.

Further, a number average molecular weight (GPC in terms of polystyrene) of the resin component may be, for example, 1,000 or more, preferably 2,000 to 30,000, and more preferably about 3,000 to 25,000. When the molecular weight is too small, the function of improving the releasability from the pin may deteriorate, and when the molecular weight is too large, the wear resistance may decrease, and the noise suppression of the belt may decrease.

The resin component may be a hydrophobic resin, but is preferably a hydrophilic resin from the viewpoints that the hydrophilic resin can be dissolved or dispersed in an aqueous solvent and the environmental load is small. The hydrophilic resin may be a thermoplastic resin or a thermosetting resin having a hydrophilic group in a side chain and/or a main chain. Specific examples of the hydrophilic resin include a hydrophilic (meth)acryl-based resin, a hydrophilic styrene-based resin, a vinyl acetate-based resin, a vinyl alcohol-based resin, a hydrophilic vinyl ether-based resin, polyoxyalkylene glycol, a hydrophilic polyester-based resin, a hydrophilic polyamide-based resin, a hydrophilic urethane-based resin, a hydrophilic epoxy resin, and a cellulose derivative. These hydrophilic resins may be a water-soluble resin or a water-dispersible resin. Each of these hydrophilic resins may be used alone, or two or more kinds thereof may be used in combination. Among these, a hydrophilic polyester-based resin and a hydrophilic urethane-based resin are preferred from the viewpoint of improving the releasability of the composite fibrous layer sheet from the pin while maintaining the adhesion and the mechanical properties of the composite fibrous layer by appropriately reacting with and/or bonding to the above-described isocyanate compound.

The hydrophilic polyester-based resin may be, for example, a resin obtained by introducing a hydrophilic group into a polyester resin obtained from the reaction between a dicarboxylic acid component or a reactive derivative thereof (lower alkyl esters, acid anhydrides) and a diol component, or a polyester-based resin obtained by ring-opening polymerization of lactones.

Examples of the above-described dicarboxylic acid component include aliphatic dicarboxylic acids (for example, $C_{4-14}$ aliphatic dicarboxylic acids such as adipic acid, suberic acid, azelaic acid, sebacic acid, and dodecane dicarboxylic acid), alicyclic dicarboxylic acids (for example, cyclohexane dicarboxylic acid), and aromatic dicarboxylic acids (for example, phthalic acid, terephthalic acid, isophthalic acid, and naphthalene dicarboxylic acid). Each of these dicarboxylic acid components may be used alone, or two or more kinds thereof may be used in combination. The dicarboxylic acid component may be used in combination with a polyvalent carboxylic acid having three or more carboxyl groups, such as trimellitic acid and pyromellitic acid, as necessary.

Examples of the diol component include aliphatic diols (for example, $C_{2-10}$ alkanediols such as ethylene glycol, trimethylene glycol, propylene glycol, 1,3-butanediol, 1,4-butanediol, hexamethylene glycol, and neopentyl glycol, and polyoxy $C_{2-4}$ alkylene glycols such as diethylene glycol and triethylene glycol), alicyclic diols, and aromatic diols. Each of these diol components may be used alone, or two or more kinds thereof may be used in combination.

Examples of the lactone include butyrolactone, valerolactone, caprolactone, and laurolactone. Each of these lactones may be used alone, or two or more kinds thereof may be used in combination.

Among these polyester-based resins, an aromatic polyester-based resin is preferred, in which an aromatic dicarboxylic acid (terephthalic acid, naphthalene dicarboxylic acid, etc.) is used as a dicarboxylic acid component, and an alkanediol (ethylene glycol, 1,4-butanediol, etc.) is used as a diol component.

Examples of the method for introducing the hydrophilic group include a method in which a diol component having a free carboxyl group or a tertiary amino group is used, and a method in which a dicarboxylic acid component having a sulfonic acid group or a carboxylic acid group is used as a dicarboxylic acid component. Among these methods, a method, in which an alkali metal salt of sulfoterephthalic acid, 5-sulfonic isophthalic acid, 4-sulfoisophthalic acid, 4-sulfonaphthalene-2,7-dicarboxylic acid, or the like (for example, sodium 5-sulfoisophthalate) is used, is widely used.

The hydrophilic urethane-based resin may be, for example, a resin obtained by introducing a hydrophilic group into a urethane-based polymer obtained from a reaction between a diisocyanate component and a diol component.

Examples of the diisocyanate component include diisocyanate compounds exemplified as polyisocyanates in the thermally reactive isocyanate compounds. Each of the diisocyanate compounds may be used alone, or two or more kinds thereof may be used in combination.

Examples of the diol components include a polyester diol and a polyether diol in addition to the diol component exemplified as the diol component in the hydrophilic polyester-based resin. Each of these diol components may be used alone, or two or more kinds thereof may be used in combination.

The polyester diol may be a reaction product of a diol component exemplified in the above-described hydrophilic polyester-based resin and a dicarboxylic acid component exemplified in the above-described hydrophilic polyester-based resin, or may be a ring-opening polymer of a lactone exemplified in the above-described hydrophilic polyester-based resin.

The polyether polyol may be a poly $C_{2-6}$ alkylene glycol such as polyethylene glycol, polypropylene glycol, polybutylene glycol, and polytetramethylene ether glycol.

Examples of the method for introducing the hydrophilic group include a method in which polyethylene glycol having high hydrophilicity is used as a diol component, and a method in which a diol (in particular, a high molecular weight diol) component having a free carboxyl group or a tertiary amino group is used. The diol used in the latter method may be prepared by, for example, a reaction between the above-described diol component and a polyvalent carboxylic acid having three or more carboxyl groups in the molecule or an anhydride thereof (for example, a tetrabasic acid anhydride such as pyromellitic anhydride), or a polyvalent carboxylic acid having a sulfonic acid group (such as sulfonic isophthalic acid), or a method in which dimethylol propionic acid, N-methyldiethanolamine, or the like is used. The tertiary amino group may form a quaternary ammonium salt.

The hydrophilic urethane-based resin may be a thermally reactive urethane-based resin in which an isocyanate group is blocked. Examples of the blocking agent include the blocking agents exemplified as the blocking agent of the above-described thermally reactive isocyanate compound. The dissociation temperature of the thermally reactive urethane-based resin may be the same as the dissociation temperature of the thermally reactive isocyanate compound, including a preferred range.

The proportion of the resin component may be about 1 to 20% by mass in the composite fibrous layer, and is, for example, about 2 to 15% by mass, preferably about 2.1 to 10% by mass, and more preferably about 2.2 to 8% by mass (in particular, about 2.3 to 7.5% by mass) from the viewpoint that the releasability of the composite fibrous layer sheet from the pin can be improved while the wear resistance of the belt is maintained. In an application in which wear resistance is important, the proportion of the resin component may be about 1 to 7.5% by mass in the composite fiber layer, and is, for example, about 1.5 to 5% by mass, preferably about 2 to 3% by mass, and more preferably about 2.1 to 2.5% by mass (in particular, about 2.2 to 2.4% by mass). When the proportion of the resin component is too small, the effect of improving the releasability of the composite fibrous layer sheet from the pin may decrease, and conversely, when the proportion is too large, the flexibility of the fibrous member or the belt may decrease.

A mass ratio of the above-described isocyanate compound to the above-described resin component can be selected from a range of former:latter=95:5 to 20:80 (for example, about 80:20 to 20:80) or so, and from the viewpoint of the wear resistance, the mass ratio is, for example, about 90:10 to 30:70, preferably about 90:10 to 20:80 (for example, about 80:20 to 30:70), more preferably about 85:15 to 40:60 (for example, about 80:20 to 40:60), and most preferably about 85:15 to 50:50 (for example, about 85:15 to 70:30). When the amount of the resin component is too small, the releasability of the composite fibrous layer sheet from the pin may decrease, and when the amount of the isocyanate compound is too small, the wear resistance may decrease, and the durability (in particular, noise suppression) when submerged may not be maintained over a long period of time.

The resin component may be present in any form as long as it covers at least a part of the fibers constituting the fibrous member. As a distribution area of the resin component present in the fibrous member, the resin component may be present either on the surface of the fibrous member or between the fibers inside the fibrous member. From the viewpoint of improving releasability of the composite fibrous layer sheet from the pin, the isocyanate compound is distributed and present substantially uniformly (in particular, uniformly) over the entire fibrous member including a space (porous structure) between the fibers inside the fibrous member. In the present invention, as described later, the resin component can be easily and uniformly distributed in the fibrous member by a method for immersing the fibrous member in a liquid composition containing an isocyanate compound and a resin component.

(Properties of Composite Fibrous Layer)

The composite fibrous layer may further contain a curing agent (for example, polyols or polyamines) of the isocyanate compound in addition to the fibrous member, the isocyanate compound, and the resin component. The proportion of the curing agent may be 100 parts by mass or less based on 100 parts by mass of the isocyanate compound, and is, for example, about 0.1 to 50 parts by mass, preferably about 0.5 to 30 parts by mass, and more preferably about 1 to 10 parts by mass.

The composite fibrous layer may further contain other components. Examples of the other components include common additives such as a surfactant, a dispersant, a filler, a colorant, a stabilizer, a surface treatment agent, and a leveling agent. The proportion of the other components may be 10 parts by mass or less based on 100 parts by mass of the cellulose-based fiber, and is, for example, about 0.01 to 5 parts by mass, preferably about 0.1 to 3 parts by mass, and more preferably about 0.5 to 2 parts by mass.

However, it is preferable that, among the common additives, the composite fibrous layer does not contain an adhesive component (in particular, a resorcinol formaldehyde resin and an epoxy resin) other than the isocyanate compound, because the composite fibrous layer has high wear resistance due to the isocyanate compound as described above and a common adhesion treatment for the fibers is not required. In the present specification and claims, a case where a trace amount of an adhesive component that does not exhibit an effect as an adhesive component is contained has the same meaning as the case where the adhesive component is not contained.

An average thickness of the composite fibrous layer may be 0.1 mm or more (for example, about 0.1 to 5 mm), and is, for example, about 0.2 to 3 mm, preferably about 0.3 to 2 mm (for example, 0.5 to 1.5 mm), and more preferably about 0.7 to 1 mm (in particular, about 0.8 to 0.9 mm). When the thickness of the composite fibrous layer is too small, the durability (in particular, noise suppression) when submerged may decrease.

[Compression Layer]

The compression layer can be generally formed of rubber (or a rubber composition). Examples of the rubber (rubber constituting the rubber composition) include known rubber components and/or elastomers such as diene rubbers (natural rubber, isoprene rubber, butadiene rubber, chloroprene rubber, styrene butadiene rubber (SBR), acrylonitrile butadiene rubber (nitrile rubber), hydrogenated nitrile rubber (including a mixed polymer of hydrogenated nitrile rubber and unsaturated carboxylic acid metal salt), etc.), ethylene-α-olefin elastomers, chlorosulfonated polyethylene rubber, alkylated chlorosulfonated polyethylene rubber, epichlorohydrin rubber, acrylic rubber, silicone rubber, urethane rubber, and fluororubber. These components may be used alone or in combination. Among these rubber components, ethylene-α-olefin elastomers (ethylene-α-olefin-based elastomers such as ethylene-propylene rubber (EPM), and ethylene-propylene-diene rubber (EPDM)) are preferred from the viewpoint of not containing halogen having a large environmental load, having ozone resistance, heat resistance, and cold resistance, and being excellent in economic efficiency.

The proportion of the rubber to the entire compression layer (or the total amount of the rubber composition) may be, for example, 20% by mass or more (for example, 25 to 80% by mass), preferably 30% by mass or more (for example, 35 to 75% by mass), and more preferably 40% by mass or more (for example, 45 to 70% by mass).

The compression layer (or the rubber or the rubber composition forming the compression rubber layer) may contain various additives as necessary. Examples of the additives (compounding agents) include known additives such as vulcanizing agents and crosslinking agents [for example, oximes (quinone dioxime, and the like), guanidines (diphenylguanidine, and the like), organic peroxides (diacyl peroxide, peroxy ester, dialkyl peroxide, and the like), and the like], vulcanization aids, vulcanization accelerators, vulcanization retardants, reinforcing agents (silicon oxides such as carbon black and hydrous silica, and the like), metal oxides (for example, zinc oxide, magnesium oxide, calcium oxide, barium oxide, iron oxide, copper oxide, titanium oxide, aluminum oxide, and the like), fillers (clay, calcium carbonate, talc, mica, and the like), plasticizers, softening agents (oils such as paraffin oil and naphthenic oil, and the like), processing agents and processing aids (phosphoric acid, metal salts of phosphoric acid, wax, paraffin, and the like), anti-aging agents (aromatic amine-based anti-aging agents, benzimidazole-based anti-aging agents, and the like), adhesion improvers [resorcin-formaldehyde co-condensation products, melamine resins such as hexamethoxymethylmelamine, co-condensation products thereof (such as resorcin-melamine-formaldehyde co-condensation products), and the like], colorants, adhesion imparting agents, coupling agents (such as silane coupling agents), stabilizers (such as antioxidants, ultraviolet ray absorbers, heat stabilizers), lubricants, flame retardants, and antistatic agents. These additives may be used alone or in combination, and these additives may be selected according to the type, application, performance, and the like of the rubber.

The proportion of the additives may also be appropriately selected according to the type of rubber and the like. For example, the proportion of the reinforcing agent (carbon black, and the like) may be 10 parts by mass or more (for example, 20 to 150 parts by mass), preferably 20 parts by mass or more (for example, 25 to 120 parts by mass), more preferably 30 parts by mass or more (for example, 35 to 100 parts by mass), and particularly preferably 40 parts by mass or more (for example, 50 to 80 parts by mass), based on 100 parts by mass of the rubber.

The compression layer (or the rubber composition) may contain short fibers. Examples of the short fibers include short fibers of the fibers exemplified as the fibers constituting the fibrous member [for example, cellulose-based short fibers such as cotton and rayon, polyester-based short fibers (PET short fibers, and the like), polyamide short fibers (aliphatic polyamide short fibers such as polyamide 6, aramid short fibers, and the like), and the like]. Each of the short fibers may be used alone, or two or more kinds thereof may be used in combination.

An average fiber length of the short fibers may be, for example, about 0.1 to 30 mm (for example, about 0.2 to 20 mm), preferably about 0.3 to 15 mm, and more preferably about 0.5 to 5 mm.

The short fibers may be subjected to a surface treatment with a surfactant, a silane coupling agent, an epoxy compound, an isocyanate compound, or the like, as necessary.

The short fibers may be subjected to an adhesion treatment as necessary in order to improve adhesion with the rubber component. As the adhesion treatment, a common adhesion treatment may be used, and examples thereof include an immersion treatment in a resin-based treatment liquid or the like obtained by dissolving an adhesive component [for example, an epoxy compound, or an isocyanate compound] in an organic solvent (toluene, xylene, methyl ethyl ketone, or the like), an immersion treatment in a resorcin-formalin-latex solution (RFL solution), and an immersion treatment in a rubber paste obtained by dissolving a rubber composition in an organic solvent.

The proportion of the short fibers may be, for example, about 0.5 to 50 parts by mass (for example, about 1 to 40 parts by mass), and preferably about 3 to 30 parts by mass (for example, about 5 to 25 parts by mass), based on 100 parts by mass of the rubber.

An average thickness of the compression layer (compression rubber layer or the like) can be appropriately selected according to the type of the belt or the like, and may be, for example, about 1 to 30 mm, preferably about 1.5 to 25 mm, and more preferably about 2 to 20 mm

[Tension Member]

The tension member is not particularly limited, and core wires (twisted cords) arranged at predetermined intervals in the belt width direction can be generally used as the tension member. The core wire is not particularly limited, and may include, for example, synthetic fibers such as polyester fibers (polyalkylene arylate fibers) and polyamide fibers (aramid fibers, and the like), inorganic fibers such as carbon fibers, and the like.

As the core wires, a twisted cord using multifilament yarns (for example, plied twist, single twist, and Lang twist) can be generally used. An average wire diameter of the core wires (i.e., a fiber diameter of the twisted cords) may be, for example, about 0.5 to 3 mm, preferably about 0.6 to 2 mm, and more preferably about 0.7 to 1.5 mm. The core wires may be embedded in the longitudinal direction of the belt, or may be embedded in parallel at a predetermined pitch in the longitudinal direction of the belt.

In order to improve the adhesion with the rubber, the core wires may be subjected to various adhesion treatments using an epoxy compound, an isocyanate compound, or the like, similarly to the short fibers.

[Tension Layer]

The tension layer may be formed of the same rubber composition as that of the compression layer, or may be formed of a fabric (a reinforcing fabric) such as canvas. Examples of the fabric (reinforcing fabric) include fabric materials such as a woven fabric, wide-angle canvas, a knitted fabric, and an unwoven fabric. Among these, woven fabrics woven in the form of plain weave, twill weave, satin weave, or the like, wide-angle canvas in which an intersection angle between warp yarns and weft yarns is about 90° to 120°, knitted fabrics, or the like are preferred. As fibers constituting the reinforcing fabric, the fibers exemplified in the item of the fibrous member (water-absorbent fibers, non-water-absorbent fibers, and the like) and the like can be used.

The reinforcing fabric may be subjected to an adhesion treatment. As the adhesion treatment, for example, the adhesion treatment exemplified in the item of the short fibers may be performed. Further, instead of the common adhesion treatment, or after the common adhesion treatment is performed, a friction treatment in which a reinforcing fabric and a rubber composition pass through a calendar roll to imprint the rubber composition on the reinforcing fabric, a spreading treatment in which rubber paste is applied to a reinforcing fabric, a coating treatment in which a rubber composition is laminated on a reinforcing fabric, or the like may be performed.

The tension layer may be formed of rubber (rubber composition). The rubber composition may further contain the same short fibers as those of the compression layer in order to prevent abnormal noise caused by adhesion of the back-surface rubber during back surface driving. The short fibers may be randomly oriented in the rubber composition. Some of the short fibers may be bent short fibers.

In order to prevent the abnormal noise during the back surface driving, a concavo-convex pattern may be provided on a surface of the tension layer (the back surface of the belt). Examples of the concavo-convex pattern include a knitted fabric pattern, a woven fabric pattern, a sudare woven fabric pattern, and an embossed pattern. Among these patterns, a woven fabric pattern and an embossed pattern are preferred. At least a part of a back surface of the tension layer may be covered with the fiber resin mixed layer.

An average thickness of the tension layer can be appropriately selected according to the type of the belt or the like, and may be, for example, about 0.5 to 10 mm, preferably about 0.7 to 8 mm, and more preferably about 1 to 5 mm

[Adhesive Layer]

As described above, the adhesive layer is not necessarily required. The adhesive layer (adhesive rubber layer) can include, for example, a rubber composition (a rubber composition containing a rubber component such as an ethylene-α-olefin elastomer) similar to that of the above-described compression layer (compression rubber layer). The rubber composition of the adhesive layer may further contain an adhesion improver (resorcin-formaldehyde co-condensation products, an amino resin, or the like).

An average thickness of the adhesive layer can be appropriately selected according to the type of the belt or the like, and may be, for example, about 0.2 to 5 mm, preferably about 0.3 to 3 mm, and more preferably about 0.5 to 2 mm.

In the rubber compositions of the tension layer and the adhesive layer, the rubber of the same system or the same type as the rubber component of the rubber composition of the compression rubber layer is often used as the rubber component. In these rubber compositions, the proportion of additives such as a vulcanizing agent, a crosslinking agent, a co-crosslinking agent, a crosslinking aid, and a vulcanization accelerator can be selected from the same range as that of the rubber composition of the compression layer.

[Method for Producing Frictional Power Transmission Belt]

The method for producing a frictional power transmission belt of the present invention includes a composite fibrous layer forming step of forming a composite fibrous layer sheet by immersing a fibrous member into a liquid composition containing an isocyanate compound and a resin component, and then, heat-setting the fibrous member impregnated with the liquid composition with a pin tenter.

(Composite Fibrous Layer Forming Step)

In the composite fibrous layer forming step, an immersion treatment of the fibrous member in the liquid composition and a heat setting treatment of the fibrous member that is impregnated with the liquid composition by the immersion are generally performed continuously, and both treatments are collectively referred to as a tenter treatment.

Figure 2:
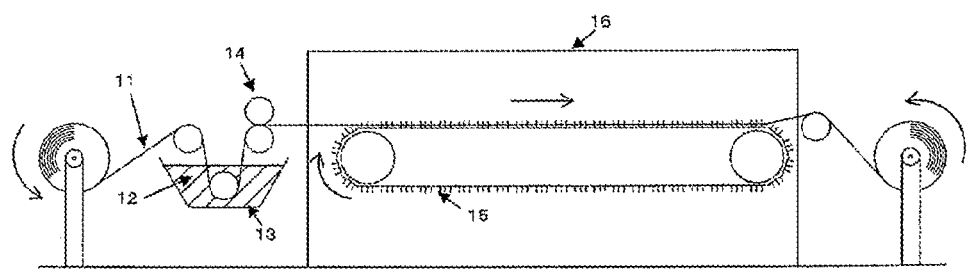
FIG. 2 is schematic view for showing steps for forming a composite fibrous layer in a method for producing the frictional power transmission belt of the present invention.

An example of the tenter treatment is shown in FIG. 2. A fibrous member 11 fed out from a roll body is first immersed in a dip bath 13 filled with a liquid composition 12 containing an isocyanate compound and a resin component, and then subjected to a dip treatment in which an excess liquid composition is dropped by a squeeze roll 14. Then, a heat setting treatment is performed in which drying and widening are performed by passing the fibrous member through a hot air drying furnace 16 while the left and right ends of the fibrous member impregnated with the liquid composition are held by a plurality of pins of the pin tenter 15. Thereafter, the above-described fibrous member (the composite fibrous layer sheet obtained by drying) is removed from the pins of the tenter and wound up.

In the composite fibrous layer forming step, the immersion treatment (dip treatment) is excellent in workability, and facilitates penetration of the liquid composition into the inside of the fibrous member. In addition, the immersion treatment allows the isocyanate compound and the resin component to be substantially uniformly distributed on the surface and the inside of the fibrous member, and allows the surface of the fiber to be substantially uniformly covered with the isocyanate compound and the resin component over the entire fibrous member.

The liquid composition containing the isocyanate compound and the resin component may contain a solvent. The solvent may be a hydrophobic organic solvent, but an aqueous solvent (water, lower alcohols such as ethanol and isopropanol, ketones such as acetone, and the like) is preferred, and water is particularly preferred, from the viewpoint of a small environmental load.

The proportion (solid content concentration) of the isocyanate compound in the liquid composition is, for example, about 0.5 to 10% by mass, preferably about 1 to 8% by mass, and more preferably about 1.5 to 5% by mass (particularly about 2 to 4% by mass), from the viewpoint that the wear resistance is increased and the durability (particularly noise suppression) when submerged can be maintained over a long period of time while maintaining the workability and the flexibility of the fibrous member and the belt well. When the proportion of the isocyanate compound is too small, the effect of improving the wear resistance may decrease, and conversely, when the proportion is too large, the workability may decrease due to an increase in the viscosity of the aqueous solution, and the flexibility of the fibrous member and the belt may also decrease.

The proportion (solid content concentration) of the resin component in the liquid composition is, for example, about 0.5 to 10% by mass, preferably about 1 to 8% by mass, and more preferably about 1 to 5% by mass (particularly about 1 to 3% by mass), from the viewpoint of being able to improve the releasability of the composite fibrous layer sheet from the pin while maintaining the workability and the flexibility of the fibrous member and the belt well. When the proportion of the resin component is too small, the effect of improving the releasability may decrease, and conversely, when the proportion is too large, the workability may decrease due to an increase in the viscosity of the aqueous solution, and the flexibility of the fibrous member and the belt may also decrease.

The mass ratio of the isocyanate compound to the resin component in the liquid composition can be selected from the range of former:latter=95:5 to 20:80, and is, for example, about 90:10 to 30:70, preferably about 90:10 to 20:80, more preferably about 85:15 to 40:60, still more preferably about 85:15 to 50:50, and most preferably about 85:15 to 70:30 from the viewpoint of the wear resistance. When the amount of the resin component is too small, the releasability of the composite fibrous layer sheet from the pin may decrease, and when the amount of the isocyanate compound is too small, the wear resistance may decrease, and the durability (in particular, noise suppression) when submerged may not be maintained over a long period of time.

In the present invention, since the isocyanate compound and the resin component are combined, the handling of the liquid composition is also excellent. That is, when the RFL solution, which is a commonly used treatment agent, is used, it is necessary to perform aging for a long time for preparing the solution, and thus, productivity is reduced. However, a liquid composition containing an isocyanate compound and a resin component (particularly, an aqueous solution containing an isocyanate compound and a hydrophilic resin) can be used only by dilution, and the productivity can be improved. Among the isocyanate compounds, when the isocyanate compound is a general isocyanate compound, the isocyanate compound is gradually cured even in the state of the immersion solution, and the handling property decreases. However, when the thermally reactive isocyanate compound is used, the compound has a long life as an immersion liquid and is easy to handle, which can improve the productivity.

In the heat setting treatment, the fibrous member impregnated with the liquid composition is heated and dried by being conveyed in a drying furnace while being widened by a pin tenter. The liquid composition permeated into the fibrous member is dried, so that the isocyanate compound can adhere to the surface of the fibers from the inside to the surface of the fibrous member. When the thermally reactive isocyanate compound is used as the isocyanate compound, drying may be performed at temperature lower than the dissociation temperature of the thermally reactive isocyanate compound and the dissociation temperature is set as T, the drying temperature may be T−10° C. or lower, for example, about T−120° C. to T−20° C., preferably about T−100° C. to T−30° C., and more preferably about T−90° C. to T−50° C., from the viewpoint that the decrease in the flexibility of the fibrous member caused by the activation and curing of the isocyanate compound through the heating in the drying treatment can be prevented, and shape defects of the belt due to insufficient elongation of the fibrous member can be prevented. The specific drying temperature may be lower than 120° C., and is, for example, about 60 to 115° C., preferably about 80 to 110° C., and more preferably about 90 to 105° C.

The drying time is not particularly limited, and in the present invention, drying can be performed at a relatively high temperature by using a thermally reactive isocyanate compound having a high dissociation temperature as an isocyanate compound, so that the drying time can be shortened, and the productivity of the belt can be improved. The drying time may be 30 minutes or less (particularly, 10 minutes or less), and is, for example, about 0.5 to 10 minutes, preferably about 1 to 8 minutes, and more preferably about 3 to 7 minutes.

As the pin tenter, a general-purpose pin tenter in which a pin portion and a pin sheet are formed of a metal such as iron or stainless steel can be used. In the present invention, the isocyanate compound and the resin component are combined, so that the heat setting treatment can be performed smoothly without performing a special treatment such as a release treatment on the surface of the pin portion. The height of the pin portion is, for example, about 5 to 30 mm (particularly, about 10 to 20 mm). The conveying speed of the fibrous member conveyed by the pin tenter is, for example, about 1 to 25 m/min (particularly, 5 to 15 m/min).

(Covering Step)

The frictional power transmission belt of the present invention can employ a common method for producing a frictional power transmission belt in addition to the above-described composite fibrous layer forming step, and can be produced frictional power transmission belt via a covering step of covering the compression layer with the composite fibrous layer. In the covering step, for example, a composite fibrous layer sheet, a compression layer formed of rubber (or a rubber composition), a tension member, and a tension layer are laminated, the obtained laminate is formed into a cylindrical shape by a shaping mold, vulcanization is performed to form a sleeve, and the vulcanized sleeve is cut into a predetermined width, whereby a belt in which the composite fibrous layer covers the compression layer can be produced.

More specifically, the V-ribbed belt can be produced, for example, by the following method.

(First Production Method)

First, using a cylindrical inner mold having an outer peripheral surface to which a flexible jacket is attached, an unvulcanized tension layer sheet is wound around the flexible jacket on the outer peripheral surface, a core wire (twisted cord) forming a tension member is spirally spun on the sheet, and an unvulcanized compression layer sheet and a composite fiber layer sheet are further wound around the core wire, thereby preparing a laminate. Next, a cylindrical outer mold with a plurality of rib molds engraved on an inner peripheral surface thereof is used as an outer mold which can be attached to the inner mold, and the inner mold around which the above-descried laminate is wound is disposed concentrically within the outer mold. Thereafter, the flexible jacket is expanded toward the inner peripheral surface (rib mold) of the outer mold to press the laminate (compression layer) into the rib mold, and vulcanization is performed. Then, the inner mold is removed from the outer mold, and a vulcanized rubber sleeve including a plurality of ribs is removed from the outer mold, whereby a sleeve-shaped V-ribbed belt can be produced. Regarding the sleeve-shaped V-ribbed belt, a V-ribbed belt may be produced by cutting the vulcanized rubber sleeve into a sleeve having a predetermined width in the belt longitudinal direction using a cutter as necessary. In the first production method, the laminate including the tension layer, the tension member, the compression layer, and the composite fibrous layer can be expanded at once to be produced into a sleeve including a plurality of ribs (or a V-ribbed belt).

(Second Production Method)

In relation to the first production method, for example, a method disclosed in JP-A-2004-82702 (a method in which only a composite fibrous layer and a compression layer are expanded to form a pre-molded body (semi-vulcanized state), then a tension layer and a tension member are expanded to be pressure-bonded to the pre-molded body, and the resultant structure is vulcanized and integrated to be formed into a V-ribbed belt) may be adopted.

EXAMPLES

Hereinafter, the present invention is described in more detail based on Examples, but the present invention is not limited to these Examples. Hereinafter, a method for preparing a rubber composition, a method for producing a belt, a method for measuring each physical property, a method for evaluating each physical property, and the like is described.

[Rubber Composition]

A rubber composition shown in Table 1 was kneaded with a Banbury mixer, and the kneaded rubber passed through a calender roll, to prepare an unvulcanized rolled rubber sheet (compression layer sheet) having a predetermined thickness.

polyester high molecular weight copolymer resin, solid content concentration: 20% by mass, anionic Polyurethane resin solution: "Cacesol UH-150", manufactured by Nicca Chemical Co., Ltd., self-emulsifying polyurethane resin, solid content concentration: 36%, anionic

TABLE 2

| | | immersion solution composition (unit: part(s) by mass or mass %) | | | | | | |
|---|---|---|---|---|---|---|---|---|
| | | A | B | C | D | E | F | G |
| Composition (parts) | Isocyanate solution | 100 | 100 | 100 | 100 | 100 | 100 | 100 |
| | Polyester resin solution | 37.5 | 225 | 600 | — | — | — | — |
| | Polyurethane resin solution | — | — | — | 20.8 | 111 | 334 | — |
| | Water | 612.5 | 1175 | 2300 | 629.2 | 1289 | 2566 | 500 |
| Isocyanate concentration | | 4% | 2% | 1% | 4% | 2% | 1% | 5% |
| Resin component concentration | | 1% | 3% | 4% | 1% | 3% | 4% | 0% |
| Total solid content concentration | | 5% | 5% | 5% | 5% | 5% | 5% | 5% |
| Isocyanate: resin component | | 80:20 | 40:60 | 20:80 | 80:20 | 40:60 | 20:80 | 100:0 |

A tension layer sheet was produced in the same manner as in the case of the compression layer sheet using the rubber composition shown in Table 1. The components in Table 1 are as follows.

EPDM: "NORDEL IP4640", manufactured by Dow Chemical Company

Zinc oxide: "zinc oxide third grade", manufactured by Seido Chemical Industry Co., Ltd.

Carbon black: "SEAST V", manufactured by Tokai Carbon Co., Ltd., average particle diameter: 55 nm Softening agent: Paraffinic oil, "NS-90", manufactured by Idemitsu Kosan Co., Ltd.

Anti-aging agent: "NOCRAC MB", manufactured by Ouchi Shinko Chemical Industrial Co., Ltd.

Organic peroxide: "Percumyl D-40", manufactured by NOF Corporation

Co-crosslinking agent: "VULNOC PM", manufactured by Ouchi Shinko Chemical Industrial Co., Ltd.

TABLE 1

| Components of Rubber Composition (parts by mass) | |
|---|---|
| EPDM | 100 |
| Zinc oxide | 5 |
| Stearic acid | 1 |
| Carbon black | 60 |
| Softening agent | 5 |
| Anti-aging agent | 2 |
| Organic peroxide | 2 |
| Co-crosslinking agent | 2 |
| Total | 177 |

[Immersion Solution of Knitted Fabric]

An isocyanate solution and a resin component (or the isocyanate solution alone) shown in Table 2 were diluted with water to prepare immersion solutions having concentrations shown in Table 2. The components in Table 2 are as follows.

Isocyanate solution: "Elastron BN-27", manufactured by DKS Co. Ltd., dissociation temperature: 180° C., solid content concentration: 30% by mass Polyester resin solution: "Hard Finishing Agent TK Set X-500", manufactured by Takamatsu Oil & Fat Co., Ltd., Examples 1 to 7 and Reference Example 1

[Preparation of Thermally Reactive Isocyanate and Resin Component Impregnated Knitted Fabric]

In Examples 1 to 6 and Reference Example 1, a cotton spun yarn (yarn count: 40, one yarn) as a cellulose-based fiber and a PTT/PET conjugate composite yarn (fineness: 84 dtex) as a synthetic fiber were knitted at a mass ratio of cellulose-based fiber to synthetic fiber of 80/20 to produce a knitted fabric (fibrous member) whose knitted structure is weft knitting (moss stitch, two layers). The thickness of the obtained knitted fabric was 0.85 mm, and the density of the knitted fabric (wale+course) was 100 yarns/inch. A surface layer was formed of cellulose-based fibers, and an inner layer was formed of synthetic fibers.

In Example 7, a cotton spun yarn (yarn count: 40, one yarn) as a cellulose-based fiber and a PTT/PET conjugate composite yarn (fineness: 84 dtex) as a synthetic fiber were knitted at a mass ratio of cellulose-based fiber to synthetic fiber (cellulose-based fiber/synthetic fiber)=60/40 to produce a knitted fabric (fibrous member) whose knitted structure is weft knitting (moss stitch, two layers). The thickness of the obtained knitted fabric was 0.85 mm, and the density of the knitted fabric (wale+course) was 100 yarns/inch. A surface layer contained cellulose-based fibers and synthetic fibers in a mass ratio of cellulose-based fibers to synthetic fibers (cellulose-based fiber/synthetic fiber)=75/25, and an inner layer was formed of synthetic fibers.

The average thickness of the knitted fabric and the density of the knitted fabric were measured as follows. The average thickness of the knitted fabric was determined in accordance with JIS L1096 (2010) by placing the knitted fabric on a flat base to remove unnatural wrinkles and tension, measuring the thicknesses at five locations with a constant load thickness measuring device, and calculating an average value as the average thickness. The density of the knitted fabric was determined in accordance with JIS L1096 (2010) by placing the knitted fabric on a flat base to remove unnatural wrinkles and tension, measuring the number of stitches in 1 inch length at any five locations, and calculating an average value as an average density.

Figure 3:
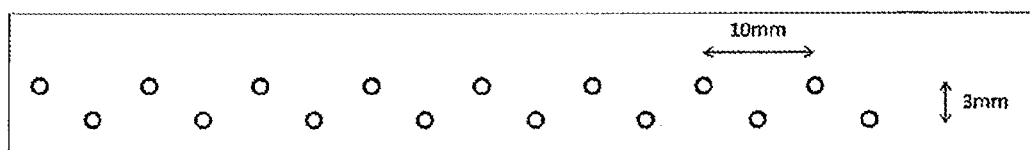
FIG. 3 is a schematic diagram showing an arrangement of pins in the pin tenter components used in Examples.

The obtained knitted fabric was immersed into each of immersion solutions A to G for 10 seconds, and then, an excess immersion liquid was dropped by a squeeze roll. Thereafter, the previous immersed knitted fabric was inserted for about 7 to 8 mm with a component [component in which pins having a diameter of 1 mm and a length of 15 mm were alternately arranged in two rows (a row interval of 3 mm) in parallel at an interval of 10 mm as shown in FIG. 3] for a pin tenter in which pins are attached to a pedestal, and was dried at 150° C. for 10 minutes (tenter treatment). After drying, the knitted fabric was pulled up by hands to check the presence or absence of damage to the composite fibrous layer sheet. The releasability of the composite fibrous layer sheet from the pin was evaluated according to the following criteria, and the evaluation results were shown in Table 3.

A: The composite fibrous layer sheet was smoothly pulled out from the pin, and the composite fibrous layer sheet was not damaged.

B: The composite fibrous layer sheet was not smoothly pulled out from the pin, and deformation or breakage occurred in the composite fibrous layer sheet.

[Production of V-Ribbed Belt]

Using a cylindrical inner mold having an outer peripheral surface to which a flexible jacket was attached, an unvulcanized tension layer sheet was wound around the flexible jacket on the outer peripheral surface, a core wire (twisted cord) serving as a tension member was spirally spun on the sheet, and an unvulcanized compression layer sheet and a composite fiber layer sheet (a thermally reactive isocyanate and resin component impregnated knitted fabric, or a thermally reactive isocyanate impregnated knitted fabric) were further wound around the core wire, thereby preparing a laminate. An aramid cord having a configuration of 1100 dtex/1×4 was used for the core wire. In order to improve the adhesion to rubber, the core wire was immersed in a resorcin-formalin-latex solution (RFL solution) in advance, and then a coating treatment was performed with a treatment liquid in which a rubber composition containing EPDM was dissolved in an organic solvent (toluene).

The inner mold around which the cylindrical laminate was wound was disposed concentrically within a cylindrical outer mold with a plurality of rib molds engraved on an inner peripheral surface thereof, the flexible jacket was expanded to press the laminate into the rib molds, and vulcanization was performed at 180° C. Then, the inner mold was removed from the outer mold, the vulcanized rubber sleeve including a plurality of ribs was removed from the outer mold, and the vulcanized rubber sleeve was cut into a sleeve having a predetermined width in the belt longitudinal direction using a cutter, thereby producing a V-ribbed belt (number of ribs: 6, peripheral length: 980 mm, belt shape: K shape, belt thickness: 4.3 mm, rib height: 2 mm, rib pitch: 3.56 mm).

[Durability Test Conditions]

Figure 4:
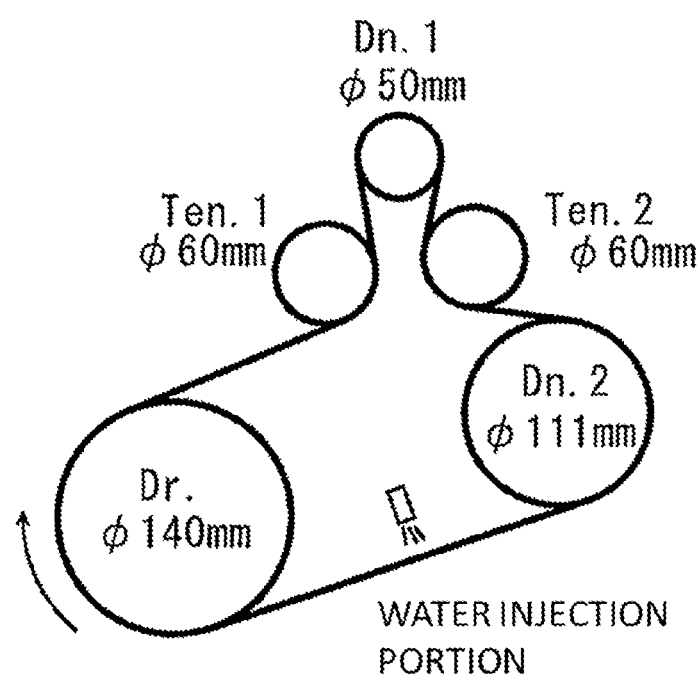
FIG. 4 is a schematic diagram showing a layout of a testing machine used in a durability test under durability test conditions in Examples.

A belt was run using a testing machine having a layout shown in FIG. 4 in which a driving pulley (Dr.) having a diameter of 140 mm, a tension pulley 1 (Ten. 1) having a diameter of 60 mm, a driven pulley 1 (Dn. 1) having a diameter of 50 mm, a tension pulley 2 (Ten. 2) having a diameter of 60 mm, and a driven pulley 2 (Dn. 2) having a diameter of 111 mm were arranged in this order, and a durability test was performed. The obtained V-ribbed belt was hung on each pulley of the testing machine, the number of revolutions of the driving pulley was varied at 800±160 rpm, a load of the driven pulley 1 was 16 N m, the driven pulley 2 was not loaded, and the belt tension was 200 N/6 ribs. Water was injected from a compression layer side of the belt at a position of a center of the driving pulley and the driven pulley 2. Water injection was performed once per 60 seconds (5 seconds), and the amount of water injection was 100 cc/second (500 cc/5 seconds). The test temperature was 25° C., and the test time was 60 minutes.

[Wear Test Conditions]

Figure 5:
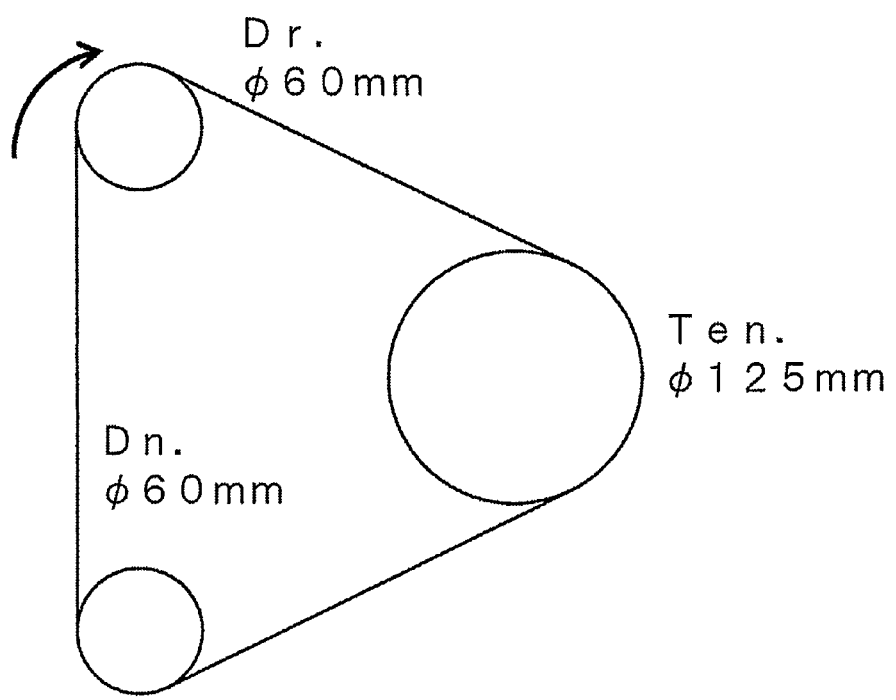
FIG. 5 is a schematic diagram showing a layout of the testing machine used in a wear test under the wear test conditions in Examples.

A belt was run using a testing machine having a layout shown in FIG. 5 in which a driving pulley (Dr.) having a diameter of 60 mm, a tension pulley (Ten.) having a diameter of 125 mm, and a driven pulley (Dn.) having a diameter of 60 mm were arranged in this order, and a wear test was performed. The obtained V-ribbed belt was hung on each pulley of the testing machine, and a load was applied such that the belt tension became 170 N. The slip rate was adjusted to 4% by setting the number of revolutions of the driving pulley to 2000 rpm and the number of revolutions of the driven pulley to 1920 rpm. The test temperature was 25° C., and the test time was 72 hours. The mass of the belt before and after the test was measured, and the wear rate was calculated based on the following formula.

Wear rate (%)=[(mass of belt before wear test−mass of belt after wear test)/mass of belt before wear test]×100

The V-ribbed belts obtained in Examples 1 to 7 and Reference Example 1 were run under the durability test conditions, and the slip rate at the time of water injection before and after the durability test, the presence or absence of noise at the time of water injection after the durability test, checking of an appearance state of the frictional power transmission surface after the durability test, and the results of the wear test are shown in Table 3.

The adhesion rate in Table 3 can be calculated based on the following formula.

Adhesion rate (%)=[(mass of composite fibrous layer sheet after tenter treatment−mass of fibrous member before tenter treatment)/mass of composite fibrous layer sheet after tenter treatment]×100

TABLE 3

| | Example 1 | Example 2 | Example 3 | Example 4 | Example 5 | Example 6 | Reference Example 1 | Example 7 |
|---|---|---|---|---|---|---|---|---|
| Immersion solution | A | B | C | D | E | F | G | A |
| Adhesion rate (isocyanate) | 9.6% | 4.8% | 2.4% | 9.6% | 4.8% | 2.4% | 12% | 8.7% |
| Adhesion rate (resin component) | 2.4% | 7.2% | 9.6% | 2.4% | 7.2% | 9.6% | — | 2.2% |
| Releasability from pin | A | A | A | A | A | A | B | A |
| Slip rate (before durability test) | 1% | 1% | 1% | 1% | 1% | 1% | — | 1% |
| Slip rate (after durability test) | 1% | 1% | 1% | 1% | 1% | 1% | — | 1% |

TABLE 3-continued

|  | Example 1 | Example 2 | Example 3 | Example 4 | Example 5 | Example 6 | Reference Example 1 | Example 7 |
|---|---|---|---|---|---|---|---|---|
| Noise suppression | No noise | No noise | Abnormal noise occurs | No noise | No noise | Abnormal noise occurs | — | No noise |
| Appearance | Not changed | Not changed | Cotton detaches | Not changed | Not changed | Cotton detaches | — | Not changed |
| Wear rate | 1.5% | 1.9% | 2.8% | 1.6% | 2.0% | 3.0% | — | 1.4% |

As is clear from the results in Table 3, Reference Example 1 using a knitted fabric impregnated with only the isocyanate compound had low releasability from the pin, had a problem in workability, and was at a level at which mass production using a pin tenter was not possible. In contrast, in Examples 1 to 7 in which the knitted fabric impregnated with the isocyanate compound and the resin component was used, the releasability from the pin was good. In addition, it was determined that the slip rate did not increase even after the durability test, and that the transmission performance was sufficient for practical use. Furthermore, the wear resistance was also excellent.

In Examples 1 and 2, no abnormal noise was generated, and no change was observed in the appearance. On the other hand, in Example 3 in which the adhesion rate of the isocyanate compound was low, abnormal noise was generated, and the result was slightly inferior in that the noise suppression when submerged was maintained over a long period of time. Between Examples 1 to 3 in which the polyester resin was used as the resin component and Examples 4 to 6 in which the polyurethane resin was used, there was no significant difference in releasability, noise suppression, and the like.

In Example 7, no abnormal noise was generated, and no change was observed in the appearance. In addition, since the surface layer contained synthetic fibers, the wear resistance was the most excellent despite the fact that the isocyanate adhesion rate was slightly lower than those in Examples 1 and 4. Furthermore, unexpectedly, as compared with Examples 1 to 6, the noise suppression was also excellent despite the fact that the proportion of the cellulose-based fibers in the surface layer was small. The reason why the noise suppression was also excellent can be presumed to be that the detachment of the cellulose-based fibers was prevented by the improvement of the wear resistance.

Although the present invention has been described in detail with reference to a specific embodiment, it is obvious to those skilled in the art that various changes and modifications may be made without departing from the gist and the scope of the invention.

The present application is based on Japanese Patent Application Publication NO. 2018-193570 filed on Oct. 12, 2018 and Japanese Patent Application Publication NO. 2019-164423 filed on Sep. 10, 2019.

INDUSTRIAL APPLICABILITY

A frictional power transmission belt of the present invention can be used as a frictional power transmission belt such as a flat belt, a V-belt, or a V-ribbed belt. In addition, since the frictional power transmission belt of the present invention have improved quietness when submerged, the frictional power transmission belt can be suitably used for high-load transmission equipment used outdoors, such as an automobile, a motorcycle, and agricultural machinery.

REFERENCE SIGNS LIST

1 Frictional power transmission belt (V-ribbed belt)
2 Compression layer
3 Tension member
4 Tension layer
5 Composite fibrous layer

The invention claimed is:

1. A frictional power transmission belt comprising a frictional power transmission surface formed of a composite fibrous layer comprising a fibrous member, an isocyanate compound, and a resin component, wherein the fibrous member contains a cellulose-based fiber.

2. The frictional power transmission belt according to claim 1, wherein a proportion of each of the isocyanate compound and the resin component in the composite fibrous layer is 2 to 15% by mass.

3. The frictional power transmission belt according to claim 1, wherein a mass ratio of the isocyanate compound to the resin component satisfies former:latter=95:5 to 20:80.

4. The frictional power transmission belt according to claim 1, wherein the isocyanate compound is a thermally reactive isocyanate compound.

5. The frictional power transmission belt according to claim 4, wherein the thermally reactive isocyanate compound has a dissociation temperature of 120° C. or higher.

6. The frictional power transmission belt according to claim 1, wherein the resin component is a hydrophilic resin.

7. The frictional power transmission belt according to claim 1, wherein the cellulose-based fiber is a spun yarn formed of cellulose.

8. The frictional power transmission belt according to claim 1, wherein the fibrous member further contains a synthetic fiber.

9. The frictional power transmission belt according to claim 1, which is a V-ribbed belt.

10. A method for producing the frictional power transmission belt according to claim 1, the method comprising immersing a fibrous member into a liquid composition containing an isocyanate compound and a resin component, and then heat-setting the fibrous member impregnated with the liquid composition by using a pin tenter, to form a composite fibrous layer sheet.

11. The method according to claim 10, wherein the liquid composition is an aqueous solution containing a thermally reactive isocyanate compound and a hydrophilic resin.

12. The method according to claim 11, comprising drying the fibrous member impregnated with the liquid composition by the immersion at a temperature lower than a dissociation temperature of the thermally reactive isocyanate compound.

13. The method according to claim 10, wherein a proportion of each of the isocyanate compound and the resin component in the liquid composition is 1 to 8% by mass.

14. The method according to claim 13, wherein a mass ratio of the isocyanate compound to the resin component in the liquid composition satisfies former:latter=95:5 to 20:80.

* * * * *